United States Patent Office 3,185,956
Patented May 25, 1965

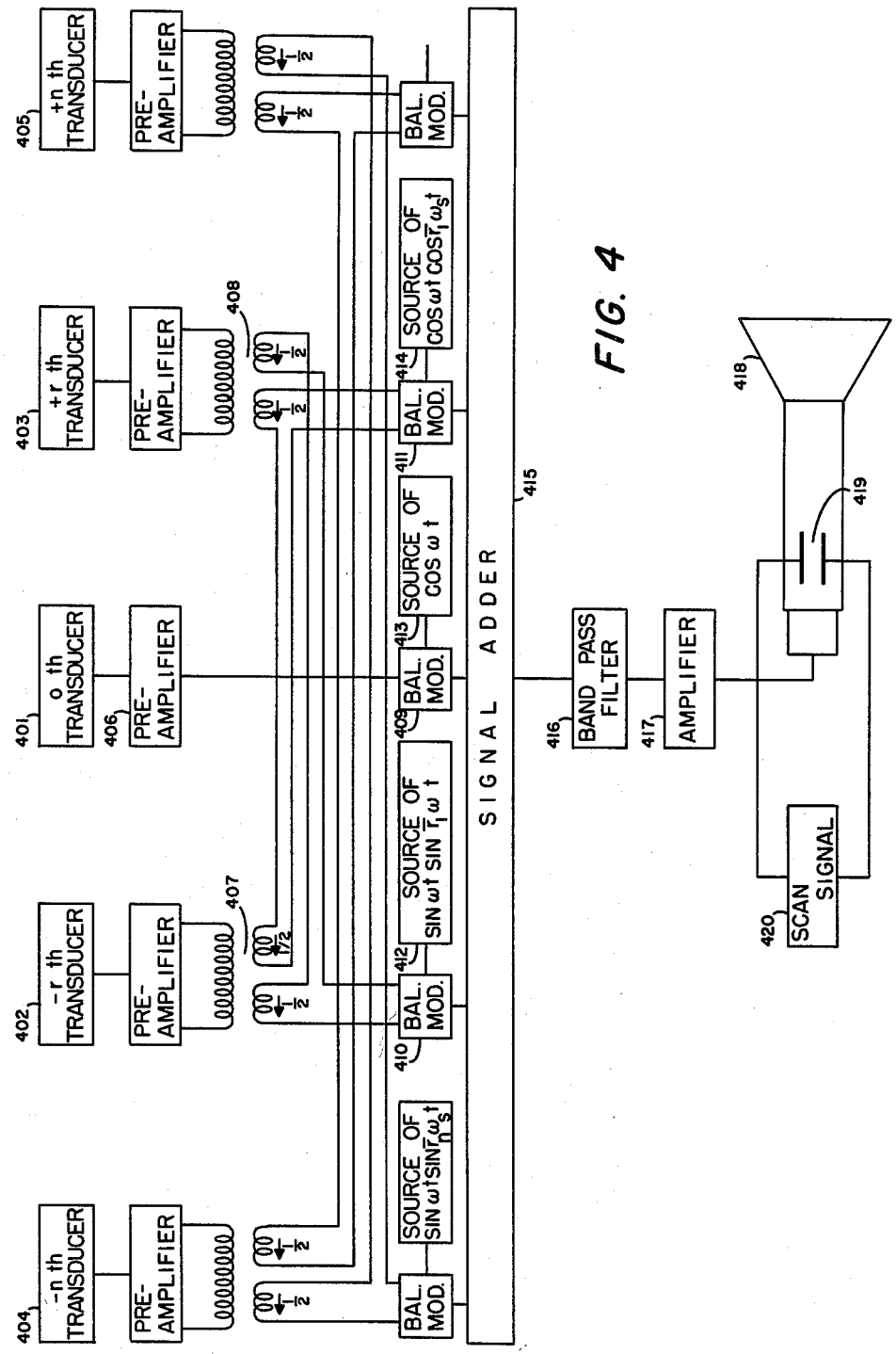

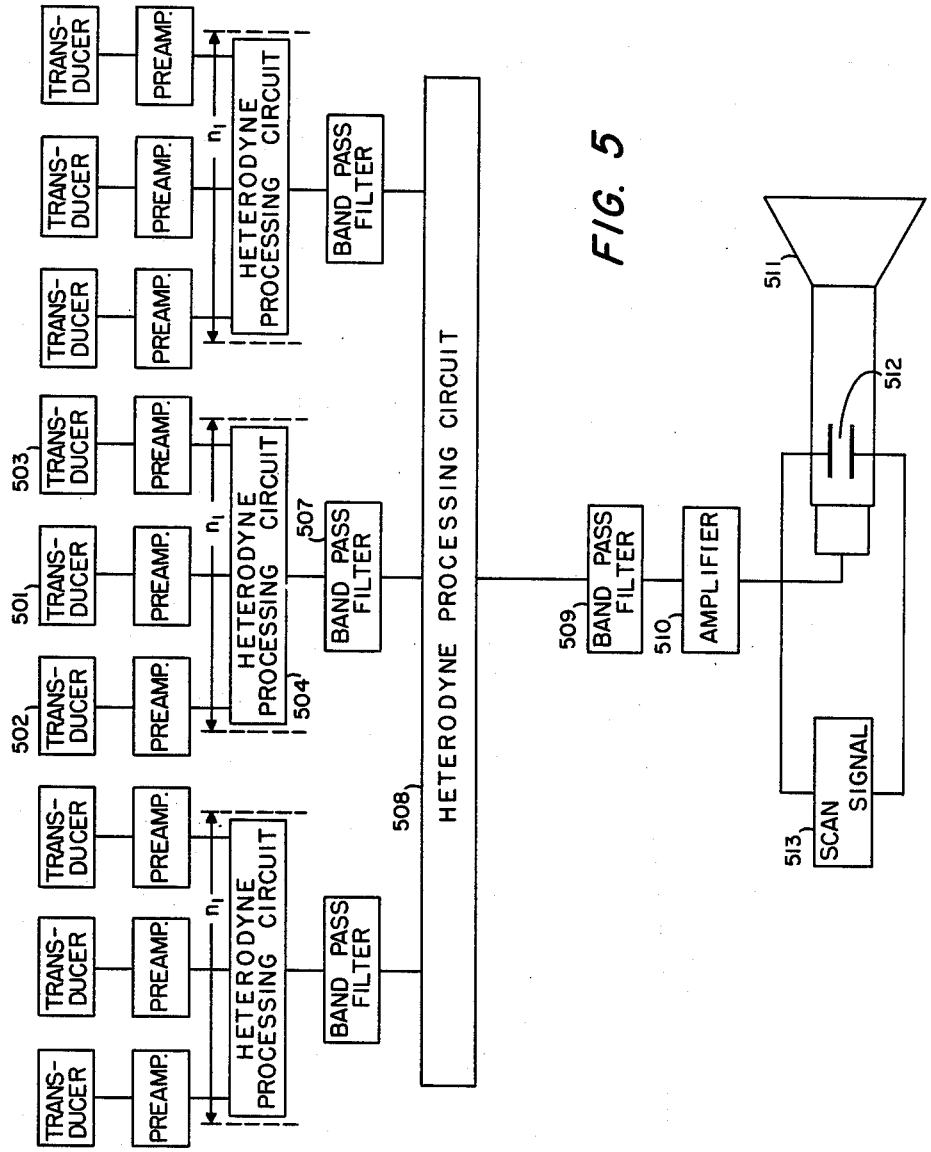

3,185,956
OBJECT DETECTING AND LOCATING APPARATUS
Gregory Michael Voglis, Teddington, and Hector Ford Willis, St. James' Park, London, England, assignors to The Commissioners for Executing the Office of Lord High Admiral of the United Kingdom of Great Britain and Ireland
Original application May 31, 1957, Ser. No. 662,942, now Patent No. 3,161,851, dated Dec. 15, 1964. Divided and this application Apr. 23, 1963, Ser. No. 275,796
2 Claims. (Cl. 340—6)

This is a division of applicants' copending application, Serial No. 662,942, filed May 31, 1957, now Patent No. 3,161,851.

This invention concerns apparatus for the rapid detection and location of objects by directional reception of energy emitted by or reflected from the objects, and, although the invention is not necessarily applicable only to apparatus responsive to acoustic energy, the invention was primarily developed for the detection and location of submerged objects by the use of acoustic energy, after the manner of the now well-known Asdic apparatus, so that, for convenience, the following description will be mainly concerned with the acoustic aspects of the invention. The Asdic apparatus is described in an article by Baxter, entitled "Sound Underwater," in Scientists Against Time, Little, Brown and Co., Boston, 1946.

In the acoustic field the reception of sound and its conversion into electrical energy is effected by a transducer, and the ability of any transducer to discriminate between sounds from different directions is represented by the "beamwidth" which is defined as proportional to the ratio $\gamma/D$ where $\gamma$ is the wavelength of the sound in the medium (e.g. liquid) in which the transducer is immersed, and $D$ is the length of the transducer face.

Ordinary forms of transducer receive effectively only when the transducer is facing directly towards a sound reflecting or sound emitting object, within an arc corresponding to the beamwidth, so that the transducer has to be turned bodily to search over a larger arc. This way of scanning cannot be used for fast searching because of physical difficulties and the limitation imposed by the time required for sound to travel from source to receiver, i.e., to the maximum range and back in the case of echo reception.

The need for moving the transducer bodily can be avoided by using a multiple element strip transducer and suitably modifying the phase relationships of the separate outputs from the individual elements before combining them, so as to scan by altering the direction of maximum response of the transducer and obtain the electrical equivalent of turning the transducer bodily without actually moving it. The phase changes required to produce this effect have in previous systems been effected discontinuously so that the direction of maximum sensitivity of reception is deflected in steps.

The present invention is an improvement on the aforesaid electrical scanning and enables continuous and rapid deflection of the direction of "beamed" reception to be obtained in a simple manner, so that it is inherently capable of very high speed operation. It can be applied to apparatus using a highly directive sound receiver in conjunction with a suitable local transmitter from which sound is emitted over a wide angle which is scanned by the receiver; it may also be applied to the scanning of sounds emanating from distant sources over a wide sector.

The method used has been designated "modulation scanning" and is based on the fact that a frequency change imparted to any signal is equivalent to a phase modulation of that signal which is linear with respect to time. More explicitly, suppose that the original signal of frequency $f_0$ is subjected to a frequency change, the result being a signal of an amplitude proportional to that of the original signal and of frequency $f_0+\Delta f$ where $\Delta f$ is the frequency increment. If now this resultant is compared with its original form, it can be interpreted as a signal at frequency $f_0$ the phase of which increases linearly with time, the maximum phase deviation being $2\pi$ changing at the rate of $2\pi\Delta f$ rad./sec. As the modulation scanning speed is determined by this rate of phase change, it follows that it is entirely dependent on the frequency change $\Delta f$.

The application of this principle to transducers follows simply. If the transducer consists of N elements and by some means the frequency of every signal obtained from the elements is changed so that the resultant frequencies form the sequences $$f_1-nf_s, \ldots f_1-f_s, f_1, f_1+f_s, \ldots f_1+(n-1)f_s,$$
$$f_1+nf_s \text{ for } N=2n+1$$

or $$f_1-(n-\tfrac{1}{2})f_s, \ldots f_1-\tfrac{1}{2}f_s, f_1+\tfrac{1}{2}f_s, \ldots f_1+(n-\tfrac{1}{2})f_s$$
$$\text{for } N=2n$$

where $f_1=f_0\pm f$, $f_0$ is the acoustic frequency, $f$ a frequency of any value including 0, and $f_s$ the scanning frequency, then the added resultants represent mathematically a beam of beamwidth equal to that of the entire transducer, scanned periodically but continuously over a sector equal to N times the beamwidth at the rate of $f_s$ scans per sec., the direction or bearing of maximum sensitivity within the scanning sector being at every instant uniquely determined by the phase of the scanning cycle, i.e. as harmonic functions of time.

In more general terms, any method of frequency change or modulation, which reduces a set of voltages of the form $$a \cos (2\pi f_0 t + r\phi)$$

where $$r=-n, -(n-1), \ldots 1, 0, +1, \ldots, n-1, n$$
$$\text{for } N=2n+1$$

or $$r=-(n-\tfrac{1}{2}), -(n-\tfrac{3}{2}), \ldots -\tfrac{1}{2}, \tfrac{1}{2} \ldots, n-\tfrac{3}{2}, n-\tfrac{1}{2}$$
$$\text{for } N=2n$$

to a single function of the type $$ab \cos [2\pi(f_0 \pm f)t] \frac{\sin \tfrac{1}{2}N(\phi \mp 2\pi f_s t)}{\sin \tfrac{1}{2}(\phi \pm 2\pi f_s t)}$$

where $a$ and $b$ are constants and N is either $2n+1$ or $2n$, can be regarded as a practical realization of the basic principle of modulation scanning.

The invention accordingly comprises apparatus for directional reception of sound or supersonic or subsonic energy propagated in a fluid and for periodic uniform and continuous deflection of the direction of maximum sensitivity of reception at a selected scanning frequency, comprising a transducer immersed in the fluid and subdivided into elements, means of coherently modulating the outputs of each element and of processing their resultants so as to introduce between the outputs of any element and its adjacent element to one particular side, effective and coherent phase shifts linearly varying with time but always the same for all adjacent pairs of elements at every instant of the modulation cycle, means of adding the processed modulation products to produce a single carrier modulated electrical signal of carrier frequency smaller or larger than or equal to the acoustic frequency and of carrier amplitude proportional to the magnitude of the sound appropriate to the deflection of the beam at any instant, and means of displaying on a C.R.O. screen the signal thus derived so as to determine, from the phase of the scanning cycle at the instant of maximum carrier amplitude response, the direction or bearing of a transmitting or reflecting source of the received sound relative to the normal to the transducer face.

Perhaps a better understanding of the invention can be obtained by comparison of the signals derived from an analogous mechanically scanned system. Imagine for example a horizontal array consisting of an odd number of transducers lying in a vertical reference plane and rotatable about a vertical axis in the reference plane through the center transducer. Now imagine that the array is rotating, and has just assumed a position coincident with the reference plane at the instant that a plane wavefront is passing through the reference plane. In this position the tranducers, with the exception of the center transducer, are moving parallel to the direction of propagation of the wavefront; those to one side of center moving with the wavefront and those on the opposite side moving in the opposite sense. The velocity of each transducer according to simple mechanics relative to that of the reference plane is proportional to its distance from the center. The pair of transducers nearest the one at the center, thus, effect a doppler frequency shift $\Delta f$ in the passing wavefront according to wave mechanics is nearly proportional to the velocity of that transducer for small changes in frequency. The next nearest transducer being twice as far from the center effect a frequency shift $2\Delta f$, the third $3\Delta f$, etc. The center being stationary produces no doppler. Transducers placed between those in the above array to form a symmetrical even numbered array would obviously effect intermediate values $\Delta f$ such as $\frac{1}{2}\Delta f$, $\frac{3}{2}\Delta f$, etc. The present invention produces an apparent rotation by heterodyning the signals from an array with a spectrum of locally generated synchronous signals with frequencies corresponding to the values of $\Delta f$ as set forth above.

Even though the signals at each of the transducers are different in a mechanically rotated array there is a certain phase coherence between signals. For example, if the entire array were stationary and instantaneously brought to scan rotation velocity, a cycle of each $\Delta f$ would start at the same instant. This phase coherence must also be present in a heterodyne processing or steering system.

Thus coherence does not require rephasing of the locally generated synchronous signals, but means rather that care should be taken to avoid unnecessary shifts in the relative phase of the signals processed.

A more thorough analysis indicates the simulation of one or more, depending on the scan frequency, rotating arrays spaced at angles to one another, but only the one in closest coincidence with the reference plane of the transducers is effective. This is due to the limits placed on the input signal available for processing by the directivity of the fixed transducer structure.

The active period of each simulated transducer is one cycle of the lowest $\Delta f$ which may therefore be used as a time base.

The invention is best understood with reference to the accompanying drawings, wherein:

FIGS. 3 and 4 show different circuit embodiments for producing an output at a frequency other than the acoustic frequency of the scanning system of the present invention;

FIG. 5 shows a scanning system according to the invention.

Figure 1:
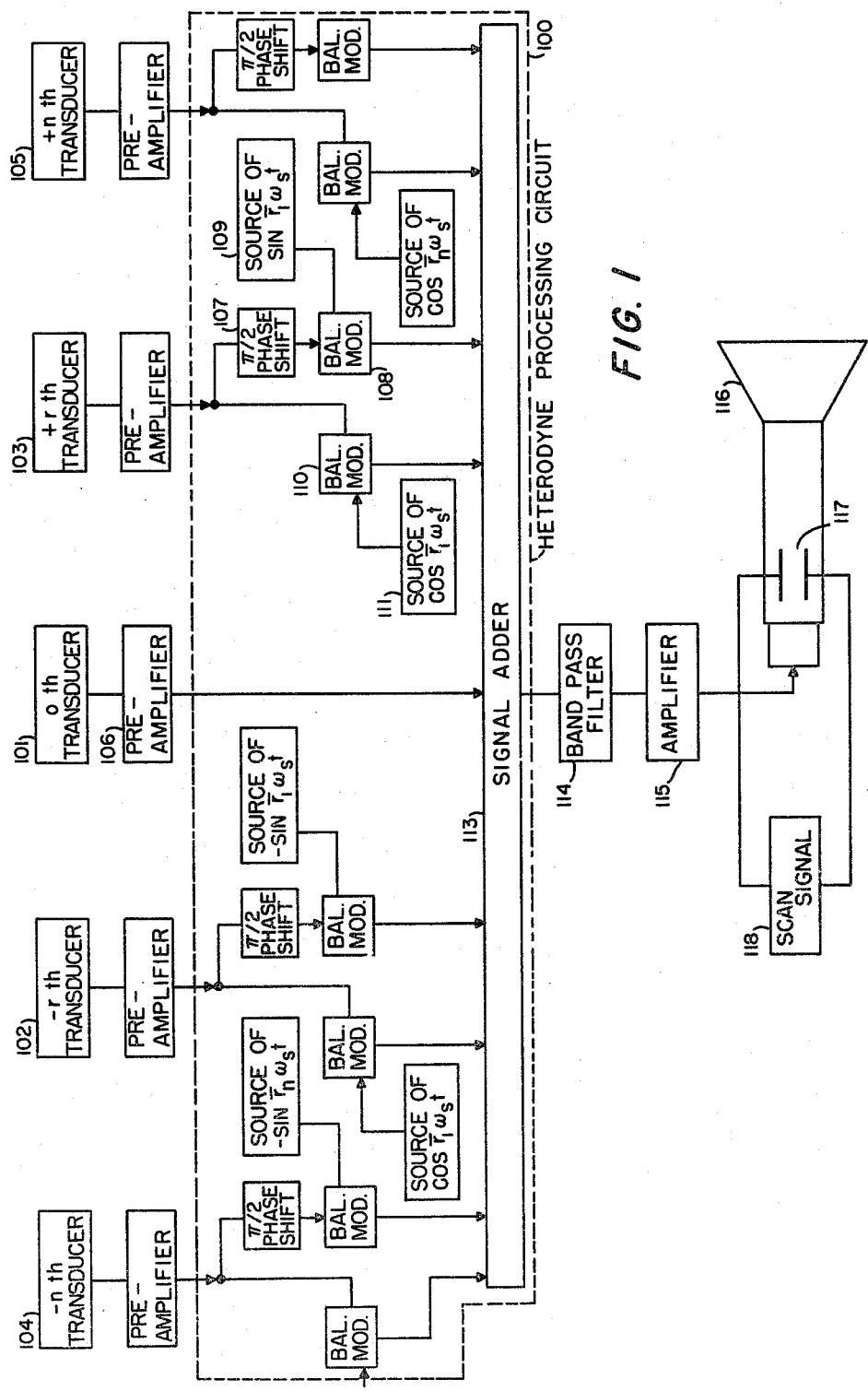
FIGS. 1 and 2 show different circuit embodiments for producing an output centered on the acoustic frequency of the scanning system of the present invention.

Referring to FIG. 1 a simple form of the invention is shown. As will be the case with all of the species disclosed herein the array consists of a plurality of N transducers one of which may be centered and will be called the zero-th transducer 101. On each side of the center are "n" transducers the $n$th transducers 104 and 105 being at the ends of the array and remaining $r$th transducers such as 102 and 103 arranged in ascending order from the center to each end. The term "$r$" is merely an integral number denoting the order of the transducer and should not be confused with $\bar{r}$ which shall be discussed presently.

With the exception of the center transducer the acoustic signals received by each of the transducers becomes an electrical signal and is applied to the input of a balanced modulator, as for example 110. Each of these same input signals is also passed through a quarter-wavelength phase shifter such as 107 and applied to the input of a second balanced modulator 108. A preamplifier, such as 106, will generally be required at each transducer to provide sufficient drive for the modulator.

The phase shifted signals to one side of center are modulated by a local signal source 109 with a waveform $\sin \bar{r}\omega_s t$. The same signals on the opposite side are modulated by a similar signal inverted in phase. The factor $\bar{r}$ is a constant which varies directly with the spacing from center and may be simply defined in an equally spaced transducer array as the ratio of the distance from center divided by the transducer spacing. The term $\omega_s$ is the desired angular scanning frequency of the array. The remaining non-phase-shifted signals are modulated with a source 111 of $\cos \bar{r}\omega_s t$. All of the signals are then applied to a common adder 113.

With the exception of the center transducer the acoustic signals received by each of the transducers becomes an electrical signal and is applied to the input of a balanced modulator, as for example 110. Each of these same input signals is also passed through a quarter-wavelength phase shifter such as 107 and applied to the input of a second balanced modulator 108. A preamplifier, such as 106, will generally be required at each transducer to provide sufficient drive for the modulator.

The phase shifted signals to one side of center are modulated by a local signal source 109 with a waveform $\sin \bar{r}\omega_s t$. The same signals on the opposite side are modulated by a similar signal inverted in phase. The factor $\bar{r}$ is a constant which varies directly with the spacing from center and may be simply defined in an equally spaced transducer arry as the ratio of the distance from center divided by the transducer spacing. The term $\omega_s$ is the desired angular scanning frequency of the array. The remaining no-phase-shifted signals are modulated with a source 11 of $\cos \bar{r}\omega_s t$. All of the signals are then applied to a common adder 113.

Although the resultant signal from the adder would appear to be quite complex an examination of the inputs reveal that this is not so. The use of balanced modulators eliminates the original acoustic frequency as an output. The phase shift effected, for example by element 107, together with the phase difference of the modulating signals eliminates one sideband. The fact that one set of modulating signals is inverted results in the elimination of the low frequency sidebands on one side and the high frequency sidebands on the other. Thus the remaining signals are just those discussed above in the mechanically rotated array.

The resultant adder signal may then be passed through a filter 114 with a minimum band-pass of $(N-1)f_s + df$ where N is the number of transducers, fs is the scanning frequency and df the bandwidth of the transducer; the center frequency of the filter being the input acoustic frequency. The signal may also be passed through an amplifier 115, if required, to drive a display means. Usually the display means will be a cathode ray tube 116, as in the Asdic apparatus mentioned above, and the signal operates the intensity grid, although it could equally well be applied to another control element. A source 118 of scan frequency signal is applied to one set of deflection plates 117 to provide a time or angular base for the information displayed.

Figure 2:
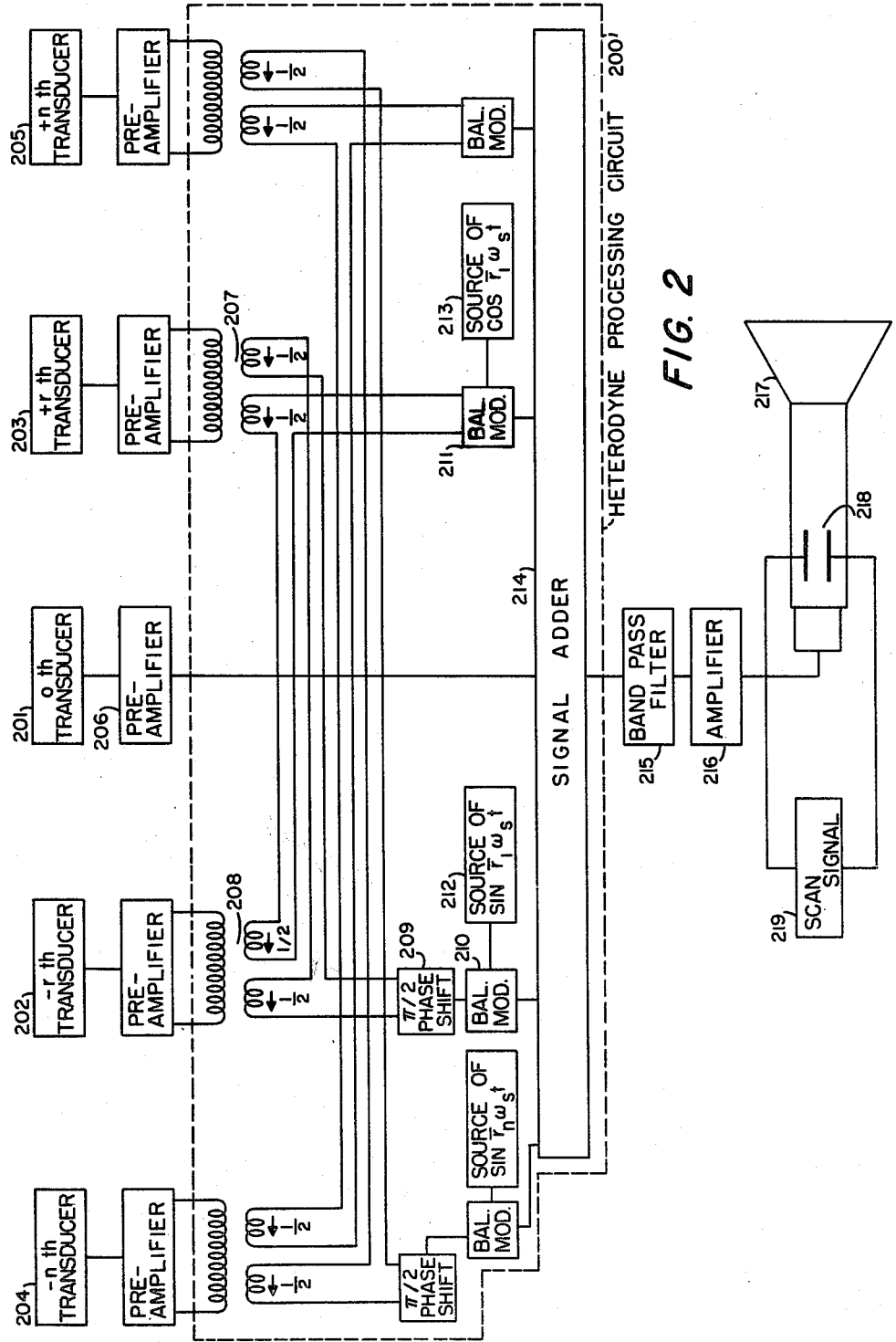

FIG. 2 shows a further embodiment for achieving the results obtained in the structure described above. Again the transducers 201–205 are arranged as before and each may have a preamplifier 206. The output of each preamplifier contains a divider circuit 207 or 208 which produces two equal signals. To one side of center a half output of each divider is passed through a separate quarter-wave phase shifter 209 and thence drives a balanced modulator 210. The signal is there modulated by a source 212 of sin $\bar{r}\omega_s t$. Similarly a half output from each transducer on the opposite side is fed without phase shift to a separate balanced modulator, for example element 211, and modulated by a source 213 of cos $\bar{r}\omega_s t$. The remaining half-output from each divider is combined in antiphase relationship with the previously mentioned half-output of the complementary transducer equally spaced from the center of the array on the opposite side. As shown a transformer type divider is well suited for this purpose. The modulator outputs are then combined in an adder 214 and may be filtered by element 215, boosted in amplifier 216 and displayed by elements 218–219 which correspond to exactly the same elements found in FIG. 1.

Although it is not immediately apparent the action of this circuit is quite similar to that in the FIG. 1 device. If one considers that a signal is received only by a transducer on one side such as element 202 there are two modulator branches for this signal through elements 210 and 211. Similarly, if transducer 203 receives a signal it passes through the same two branches. The source of sin $\bar{r}\omega_s t$ is inverted on one side of the array in FIG. 1, but this is compensated in the FIG. 2 device by the antiphase signals supplied by the dividers 207 and 208.

Figure 3:
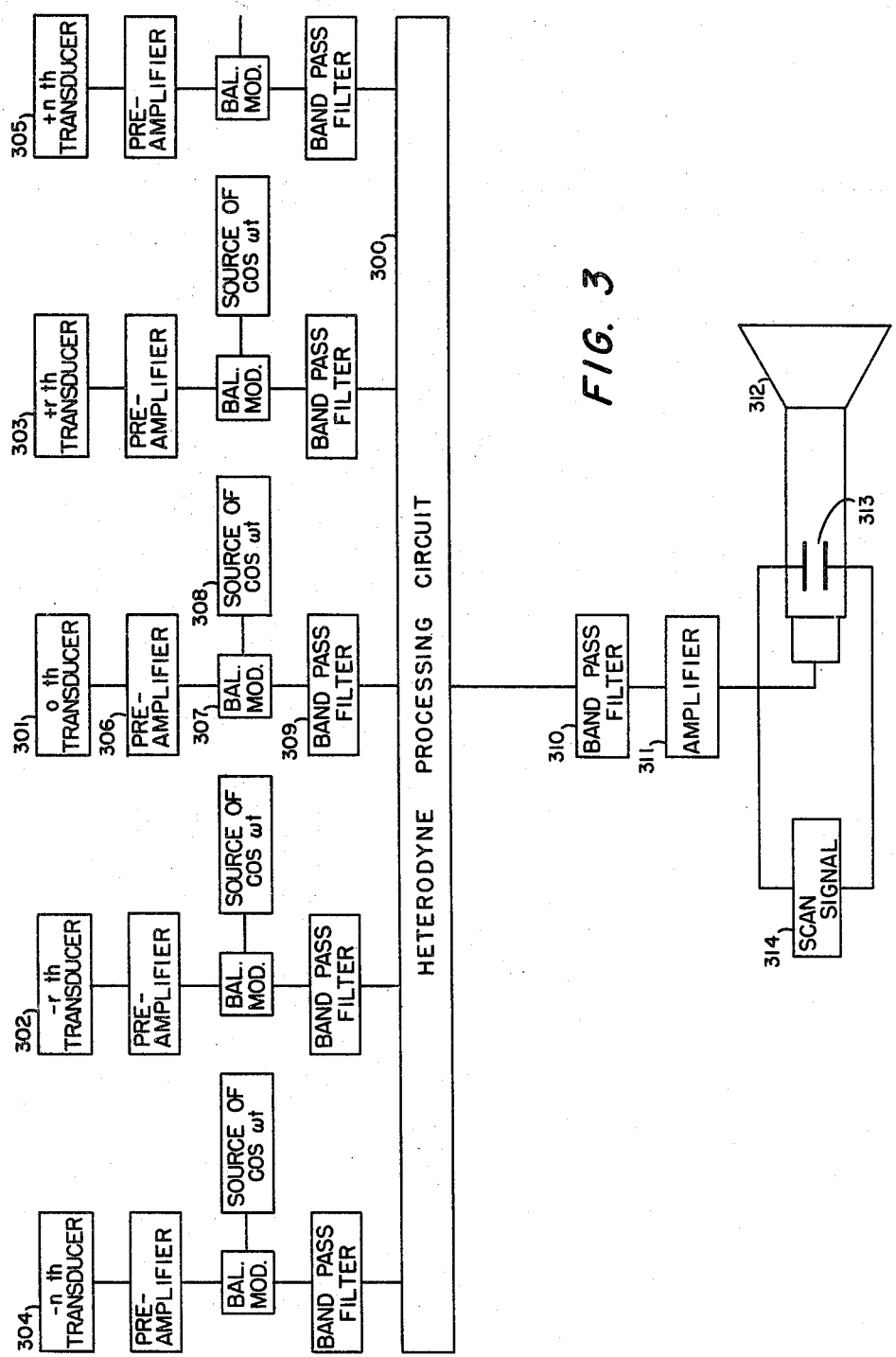

FIG. 3 shows a scanning system which can be used over a wide range of acoustic input frequencies. Like the system previously described it contains a similar group of transducers 301–305 each of which may have a preamplifier 306. The signals feed a heterodyne processing circuit 300 which can be chosen from any of the two preceding species such as 100 in FIG. 1. The acoustic signal from each transducer in this arrangement, however, passes through a different balanced tuning modulator 307 and a band-pass filter 309 before it is applied to the processing circuit 300. In element 307 the input signal is modulated by a source 308 of cos $\omega t$. The value of $\omega$ depends on the input acoustic frequency and the intermediate input frequency of the heterodyne processing circuit. The value of $\omega$ is chosen so that its sum or difference with the acoustic input frequency equals the intermediate frequency. Band-pass filter 309 is tuned to the intermediate frequency and has the same bandwith as the transducers. With this arrangement only $\omega$ needs to be adjusted for a change in acoustic frequency and retuning of the band-pass filters is unnecessary. Elements 310–314 may be the same as corresponding structure in preceding embodiments.

FIG. 4 employs the same array 401–405 of transducers each with a preamplifier 406 as described in previous embodiments. The output of each preamplifier is passed through a divider, as elements 407 and 408, and fed to symmetrically located modulators 410 and 411 as taught in FIG. 2 for example. The modulators on one side of the array are connected to a source of sin $\omega t$ sin $r\omega_s t$, while those on the opposite side are fed from a source of cos $\omega t$ cos $\bar{r}\omega_s t$. The center transducer, if present, is provided with a modulator 409 connected to a source of cos $\omega t$.

Comparison with the structure of FIG. 4 with that in FIG. 2 shows that the modulation products are similar except that there are two sets in FIG. 4 separated in frequency from those in FIG. 2 by the factor $\omega$. The components are combined in adder 415 and passed through a filter 416 with a band-pass similar to filter 114 in FIG. 1. The center frequency of this filter is tuned to either the sum or difference of the acoustic input frequency and $\omega$ so that one set of resultant components is obtained. Elements 417–420 may be used to display the result as in previous embodiments.

Other embodiments of circuits producing an output centered on the acoustic frequency of the scanning system of the present invention as well as other embodiments for producing an output at a frequency other than the acoustic frequency of the scanning system, are shown in applicants' copending application, Serial No. 662,942, filed May 31, 1957.

The various components for the systems heretofore described are all well known elements, which have been developed extensively in the prior art and are discussed in standard textbooks on audio and radio engineering. The only problem which might present itself in circuits of this type would be that of providing bandwidth for separation and filtering the various signals. With the frequency translation systems using sin $\omega t$ signals provided the problem of bandwidth is no longer a limitation since the bandwidth may always be made a small percentage of the signals in various parts of the system.

FIG. 5 shows a scanning system which employs a combination of the structures described in the preceding figures. This system employs an array which is divided into a plurality of subgroups of $n_1$ transducers, as for example the transducers 501, 502 and 503. The signals from each group are fed to a separate heterodyne processing circuit 504 chosen from any of the forms previously described. The frequency translation structure described in FIGS. 3 and 4 may also be employed with the heterodyne processing structure, but is omitted for the purpose of simplifying the discussion which follows. The output of each of the heterodyne processing units passes through a band-pass filter corresponding to those employed in the systems previously described.

The outputs of these filters form the inputs for a second stage or heterodyne processing circuit 508. In designing the second stage processing circuit each filter output from the first stage including elements 504 and 507 is treated as a fictitious transducer input and the scanning frequency is assumed to be $n_1 f_s$. Filter 509 is designed on the bandwidth and scanning frequencies thus defined in the same manner as filter 114 from FIG. 1. It is obvious to those skilled in the art that, since the bandwidth of filter 507 is greater than the transducer 501 and the scanning frequency of the second stage is increased, the frequency translation structure of FIGS. 3 and 4 will generally be desirable in the second stage. The output signals from filter 509 may be used with display elements 510–513 as described in previous embodiments.

The principle of two stage modulation scanning can be readily extended to any number of stages, for the $g_1$ outputs of the first modulation stage may be divided again into $$g_2\left(=\frac{g_1}{n_2}\right)$$

groups of $n_2$ elements each. Each group is now scanned separately but coherently at the scanning frequency $n_1 \cdot f_s$ in a similar manner as in the first stage of a two scanning process. There will be $g_2$ independent second stage scanned outputs which can be divided again into $$g_3\left(=\frac{g_1}{n_3}\right)$$

groups and scanned at the frequency $n_2 f_s$. This process can be extended to any number of stages without affecting the final result. For it can be proved mathematically that, provided at any stage, consisting of one or more groups, the scanning is carried out at a frequency equal to that of the proceeding stage times the number of elements contained in each of its groups, the final output obtained from a multistage scanning process is identical to that derived from a single stage scanning method, the paramters N and $f_s$ remaining the same.

Multistage modulation scanning shows many advantages over single stage methods, the most important being a substantial reduction in the number of modulating voltages required to operate the scanning gear. This saving is particularly pronounced when N is a large number i.e. a narrow beam is to be scanned over a large sector. In all such cases multistage modulation will result in a worthwhile reduction in the size of the scanning gear as compared with that obtained by application of single stage modulation scanning methods.

The number of stages to be employed in a multistage scanning process, will largely depend on the magnitude of N but in any case no requirements for more than 4 stages of modulation are likely to occur in practice.

The multistage structure described above affords the possibility of scanning an acoustic beam in two alternative modes of operation.

Consider again an N element transducer scanned with the frequency $f_s$. If single stage modulation is employed the sector scanned is equal to approximately N times the receiver beamwidth and therefore fixed. On the other hand, if the beam is scanned by means of multistage modulation, there are two alternative modes of operation, namely the beam can be scanned either (1) over the complete scanning sector at the frequency $f_s$, or
(2) over $1/n_1$ of it at the rate of $n_1 \cdot f_s$ scans per second (where $n_1$ represents the number of elements in the first stage subtransducer).

The changeover is effected by arranging the modulating voltages to the first stage modulator so that each first stage subtransducer output is proportional to the vectorial sum of all $n_1$ voltages induced in the elements of one subtransducer. In practice this can be accomplished by substituting for the A.C. modulating voltages to the modulators of the type $\cos \bar{r}\omega_s t$ of FIGS. 1, 2, 4 a direct current of suitable magnitude and short circuiting the modulation terminals of all remaining modulators.

What we claim is:
1. A scanning system, comprising:
   a plurality of apparatus for controlling the directional reception of compressional waves in a fluid medium by a plurality of arrays of transducers, the central point of each being disposed about a second central point;
   each of said apparatus comprising a plurality of modulating means each coupled to one of said transducers to modulate the signals received therefrom at a frequency proportional to the spacing of each transducer from said central point, and first combining means to combine the modulated signals from each of said transducers;
   a second plurality of modulating means to modulate the output signals from each of said apparatus at a frequency proportional to the spacing of the central point of each apparatus from said second central point and the number of transducers therein;
   and second combining means to combine the modulated signals from all of the apparatus.
2. A scanning system as described in claim 1, wherein each of said apparatus contains the same number of transducers, and said first and second combining means are band pass filters.

References Cited by the Examiner
UNITED STATES PATENTS
2,430,296 11/47 Lewis _____ 343—115
3,012,244 12/61 Langenwalter et al. _____ 343—115

CHESTER L. JUSTUS, *Primary Examiner.*